US012610405B2

(12) United States Patent
Sharma et al.

(10) Patent No.: US 12,610,405 B2
(45) Date of Patent: Apr. 21, 2026

(54) SYSTEMS AND METHODS FOR INTER-OPERATOR ACCESS TO EDGE COMPUTING DEVICES

(71) Applicant: Verizon Patent and Licensing Inc., Basking Ridge, NJ (US)

(72) Inventors: Ravi Sharma, Freehold, NJ (US); Riyaj Uddin Ahmed, Coppell, TX (US); Jignesh Patel, Haltom City, TX (US); Khalil M. Kajani, Carrollton, TX (US); Maqbool Chauhan, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 18/499,530

(22) Filed: Nov. 1, 2023

(65) Prior Publication Data

US 2025/0142642 A1       May 1, 2025

(51) Int. Cl.
*H04W 76/10*        (2018.01)

(52) U.S. Cl.
CPC .................................. *H04W 76/10* (2018.02)

(58) Field of Classification Search
CPC ..... H04W 24/02; H04W 16/14; H04W 48/18; H04W 84/042; H04L 65/1069; H04L 67/565
See application file for complete search history.

(56)                References Cited

U.S. PATENT DOCUMENTS

| | | | | |
|---|---|---|---|---|
| 2018/0324646 A1* | 11/2018 | Lee | ................... | H04W 36/0011 |
| 2019/0306251 A1* | 10/2019 | Talebi Fard | .......... | H04W 76/10 |
| 2021/0051762 A1* | 2/2021 | Young | .................... | H04W 8/08 |
| 2021/0345446 A1* | 11/2021 | Ma | ........................ | H04W 76/34 |
| 2023/0276329 A1* | 8/2023 | Wang | ................ | H04W 36/0022 455/436 |

* cited by examiner

*Primary Examiner* — Yee F Lam

(57)                ABSTRACT

A device of a first network, to which a User Equipment ("UE") is wirelessly connected, may receive, a request to access a service provided by a second network. The device may establish, based on the request, a user plane connection between the first network and the second network while the UE remains wirelessly connected to the first network. The first network may receive, from the UE, traffic that is associated with the service, and may output the received traffic to the second network via the user plane connection. The first and second networks may communicate via a connection, such as a tunnel, via respective User Plane Functions ("UPFs") of the first and second networks. The UPFs may communicate via an N9 interface. The service may be provided by an edge computing device of the second network.

20 Claims, 12 Drawing Sheets

Request particular service

UE
101

204

Receive/maintain information
associated with services, MECs,
and/or network operators

202

MEC Information
System
201

206

Identify MEC 105/network 107
associated with requested service;
identify home network 103 of UE 101

208

Request UE access to MEC
105 of network 107

Network
103

Receive/maintain information associated with services, MECs, and/or network operators 302

UE 101

Identify MEC 105/network 107 associated with particular service; identify home network 103 of UE 101 304

Request UE access to MEC 105 of network 107 306

Network 103

800

802
Receive, by first network, request for UE to access service provided by second network 804
Establish user plane connection between first network and second network for requested service 806
Receive traffic associated with UE and service 808
Route service traffic between UE and second network

1200

Bus
1210

SYSTEMS AND METHODS FOR INTER-OPERATOR ACCESS TO EDGE COMPUTING DEVICES

BACKGROUND

Wireless networks provide wireless connectivity to User Equipment ("UEs"), such as mobile telephones, tablets, Internet of Things ("IoT") devices, Machine-to-Machine ("M2M") devices, or the like. Wireless networks may deploy edge computing devices, such as Multi-Access/ Mobile Edge Computing ("MEC") devices, referred to sometimes herein simply as "MECs," at different geographical locations in order to provide services such as communication services, gaming services, streaming services, etc. The deployment at different geographical locations may serve as a load balancing mechanism between different edge computing devices, may provide lower latency to UEs located at such geographical locations, etc. Different wireless network operators (e.g., Mobile Network Operators ("MNOs")) may maintain, deploy, and/or control access for edge computing devices of their respective networks.

DETAILED DESCRIPTION OF EXAMPLE EMBODIMENTS

The following detailed description refers to the accompanying drawings. The same reference numbers in different drawings may identify the same or similar elements.

Figure 1:
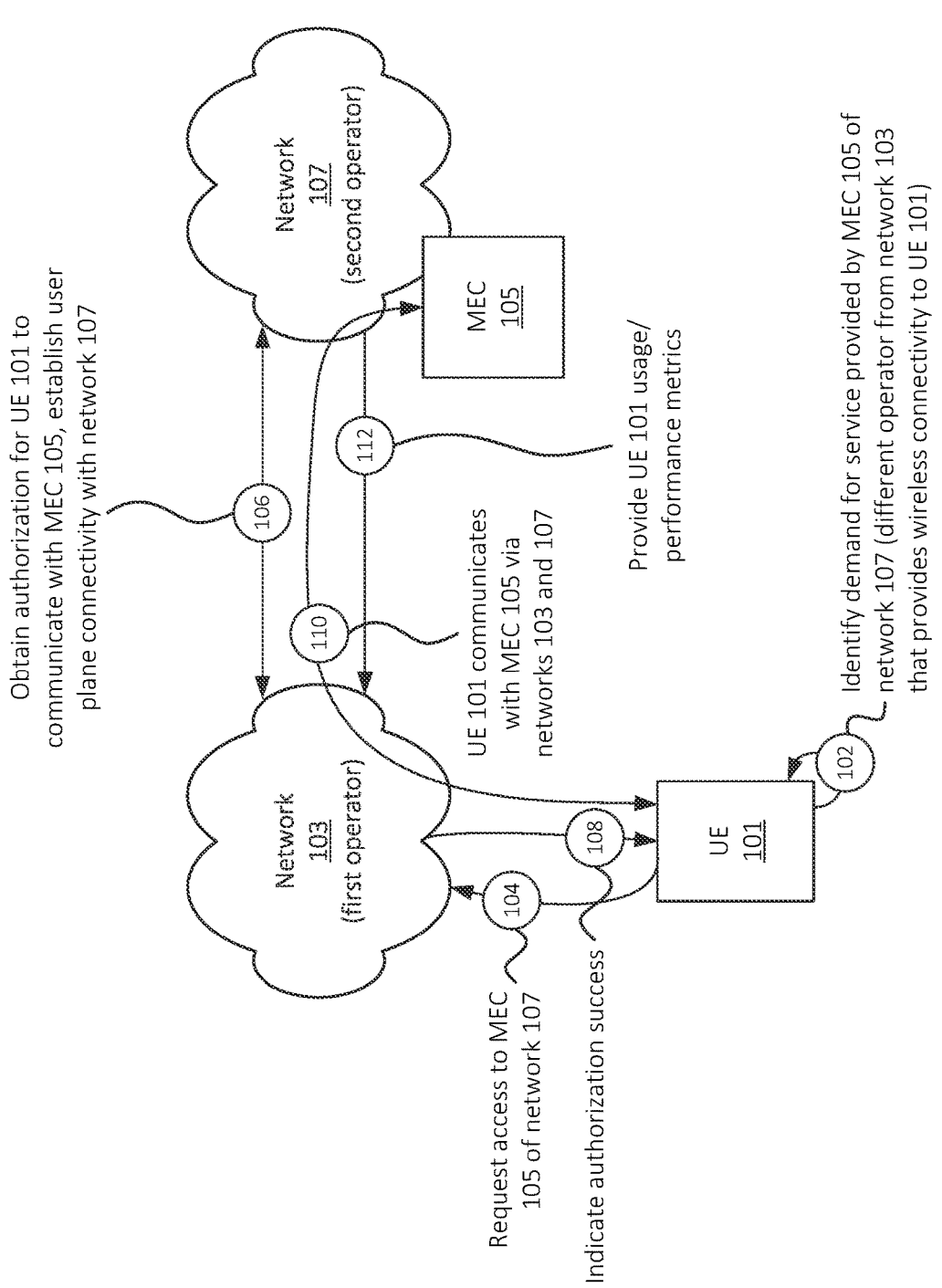
FIG. 1 illustrates an example overview of one or more embodiments described herein.

Embodiments described herein provide for access to services, such as services provided by edge computing devices, to UEs of various different networks. For example, as shown in FIG. 1, a particular UE 101 may be communicatively coupled to a first network 103, which may be associated with a first network operator (e.g., a first MNO). In some examples, network 103 may be a "home" network of UE 101, inasmuch as UE 101 and/or network 103 may maintain information indicating that network 103 is the home network of UE 101, and/or UE 101 may have been initially provisioned, configured, etc. by network 103. UE 101 may be communicatively coupled to a RAN and a core of network 103 (e.g., may receive wireless connectivity via the RAN of network 103 and the core of network 103 may perform traffic processing and forwarding functionality between UE 101 and other networks or devices).

At some point, UE 101 may identify (at 102) a demand for a service provided by an edge computing device (e.g., MEC 105) that is owned, operated, and/or otherwise associated with another network 107. For example, an application installed at UE 101 may identify such demand, or some other device or system may provide an indication to UE 101 that a service is available from MEC 105. Assume, for example, that the service provided by MEC 105 is a location and/or time-based service, such as an augmented reality ("AR") service associated with a sporting event that occurs at a particular location (e.g., a particular sports arena or other type of venue) during a given time period. Further assume that UE 101 (e.g., an application executing at UE 101) identifies that UE 101 is located at or near the particular location during the given time period (or at a time that is relatively close to the given time period, such as an hour before the scheduled start of the sporting event). In this situation, UE 101 may identify the demand for the service provided by MEC 105. For example, UE 101 (e.g., an application executing at UE 101) may maintain information associating the specific MEC 105 and/or network 107 with the service to be provided (e.g., at the particular time and location).

While the description below is applicable to the scenario provided above, techniques described herein may be applied to other types of triggers or conditions based on which UE 101 identifies a demand or otherwise determines that a request should be made for a service provided by MEC 105 that is associated with network 107 (e.g., which is associated with a different network operator than the network operator of network 103 from which UE 101 receives wireless connectivity and/or other services). For example, UE 101 may receive an indication, from an application server or other device or system (e.g., where such device or system is "aware" of MEC 105), that MEC 105 is available to provide services to UE 101. UE 101 may receive or otherwise determine (e.g., may receive from an application server, or based on a configuration of an application executing at UE 101) an identifier of network 107 (e.g., a Public Land Mobile Network ("PLMN") identifier and/or other suitable identifier), an identifier of MEC 105 (e.g., an Internet Protocol ("IP") address and/or other suitable identifier), an identifier of an operator of network 107 (e.g., an MNO identifier), an identifier of a service available from MEC 105, or other identifying information of MEC 105 and/or network 107.

Based on identifying (at 102) the demand for the service provided by network 107 (e.g., provided by MEC 105 of network 107), UE 101 may output (at 104) a request to access MEC 105 of network 107. For example, as discussed below, UE 101 may output the request to one or more elements of network 103 (e.g., a home network of UE 101 and/or a network to which UE 101 is currently wirelessly connected), where such request includes an identifier of MEC 105, network 107, and/or other suitable information. As also discussed below, network 103 may obtain (at 106) authorization for UE 101 to communicate with network 107 (e.g., with MEC 105 of network 107), which may include one or more elements of a core of network 103 communicating with one or more elements of a core of network 107. Network 107 may verify, for example, that UE 101 is authorized to access network 107, and/or that UE 101 is authorized to receive a particular type of service via network 107 (e.g., from MEC 105). Networks 103 and 107 may also establish (at 106) one or more communication sessions, via which traffic may be sent and/or received to and/or from UE 101 via networks 103 and network 107 (e.g., traffic associated with a service provided by MEC 105 and/or other suitable traffic). The communication sessions may include, for example, one or more protocol data unit ("PDU") sessions and/or tunnels (e.g., General Packet Radio Service ("GPRS") Tunneling Protocol ("GTP") tunnels). In some embodiments, the communication sessions may include a tunnel between a user plane traffic element of network 103 (e.g., a User Plane Function ("UPF") of network 103) and a user plane traffic element of network 107 (e.g., a UPF of network 107). The tunnel between the user plane traffic elements of networks 103 and 107 may include a tunnel established via an N9 interface between a UPF of network 103 and a UPF of network 107. Network 107 may also establish context information for UE 101, based on which network 107 may track session information, usage information, policy information, and/or otherwise provide service to UE 101.

Assuming that network 107 has determined (at 106) that UE 101 is authorized to communicate with MEC 105 via network 107, UE 101 may receive (at 108) an indication that the request to access MEC 105 of network 107 has been successful. Such indication may include, for example, communication information via which UE 101 may communicate (at 110) with MEC 105 via networks 103 and 107. For example, as discussed below, UE 101 may receive a PDU session identifier between UE 101 and a UPF of network 103 that UE 101 may use to output traffic destined for MEC 105. The UPF of network 103 may forward such traffic from UE 101 (e.g., as received via the PDU session, and/or otherwise indicated as being destined for MEC 105) to a UPF of network 107 via a tunnel (e.g., a GTP tunnel and/or some other suitable communication pathway between the UPFs, such as a communication pathway associated with an N9 interface between such UPFs). The UPF of network 107 may proceed to forward such traffic to MEC 105. Similarly, the UPF of network 107 may identify traffic from MEC 105, destined for UE 101, and may forward such traffic to the UPF of network 103 via the tunnel.

Network 107 may further provide (at 112) UE usage metrics, performance metrics, and/or other suitable information associated with communications between UE 101 and MEC 105. In this manner, network 103 may be made aware of such metrics, and may perform operations such as adjusting network parameters, charging UE 101 for usage of network resources of network 107, tracking amounts of traffic sent to and/or received by UE 101 via network 107, or other suitable operations. In this manner, access to MEC 105 may be more secure from the standpoint of network 107, inasmuch as MEC 105 need not be left "open" for access by UEs 101 that are not registered with network 107. For example, the techniques described herein provide for a network-assisted authentication and/or authorization mechanism for UEs 101 seeking access to MEC 105 of network 107. An operator of network 107 may, for example, be able to enforce access and/or usage policies of UEs 101 accessing network 107 via another network 103. Additionally, since communications are established with network 107 via network 103, authentication and/or authorization techniques used by network 103 (e.g., to authenticate UE 101) may be leveraged to further enhance the security of network 107. Additionally, usage of UEs 101 that access MEC 105 via network 107, where such UEs 101 are not registered with network 107, may be indicated to their respective home networks (e.g., network 103), thus providing a mechanism for charging such UEs 101 for usage of network 107.

Figure 2:
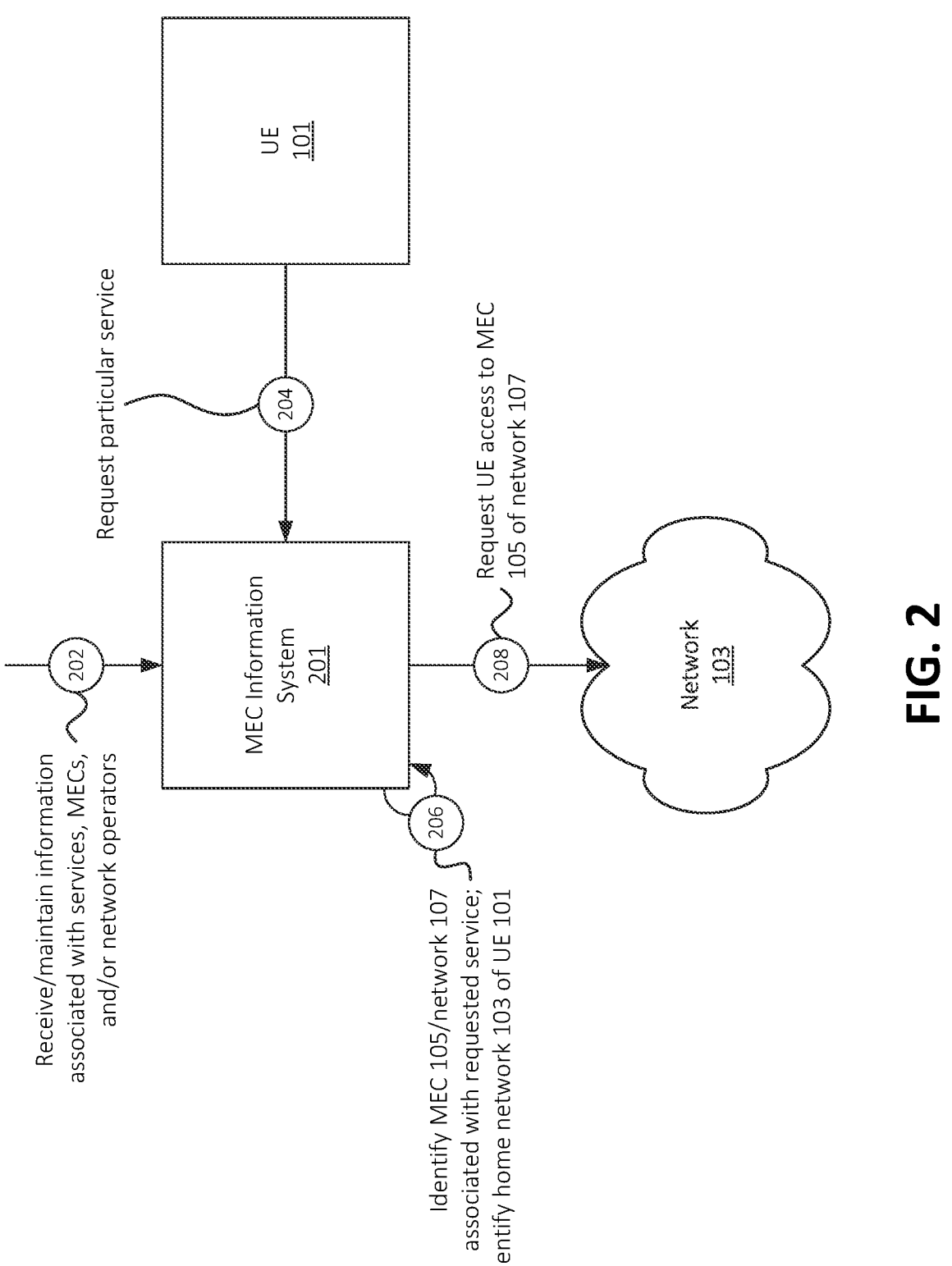
FIGS. 2 and 3 illustrate examples of outputting a request for a UE to access services provided by a network other than a network to which the UE is connected, in accordance with some embodiments.
Figure 3:
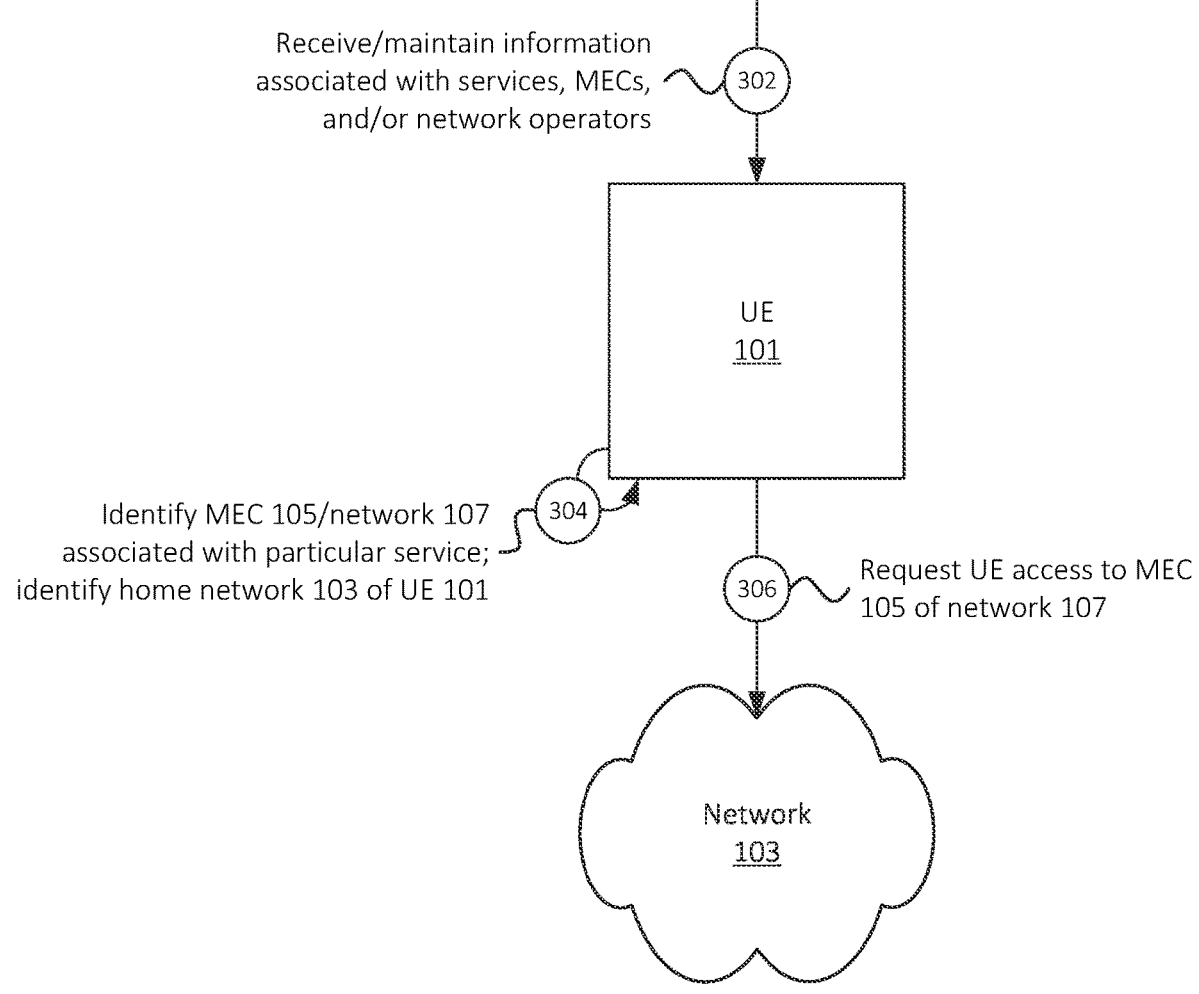

FIGS. 2 and 3 illustrate examples of how UE 101 may identify (e.g., at 102) a demand for a service provided by MEC 105 (e.g., a MEC that is associated with a different network to which UE 101 is currently connected), and may request (e.g., (at 104) access to MEC 105. As shown in FIG. 2, for example, MEC Information System ("MIS") 201 may receive and/or maintain (at 202) information associated with services, MECs, networks, and/or network operators. For example, MIS 201 may receive such information from different network operators (e.g., MNOs associated with different networks such as networks 103 and 107) via a web portal, an application programming interface ("API"), and/ or some other suitable communication pathway. In this manner, MIS 201 may be "aware" of different MECs, networks, services, etc. MIS 201 may receive (at 202) the information in an ongoing manner, such that MIS 201 maintains up-to-date information.

At some point, UE 101 may request (at 204) that a particular service be provided to UE 101, such as a gaming service, an AR service, a teleconferencing service, etc. In such scenarios, UE 101 may not be "aware" that the service is provided by MEC 105 of another network 107. MIS 201 may identify (at 206) that the requested service is associated with MEC 105 of network 107. For example, the maintained (at 202) information may include information mapping or otherwise associating the requested service with MEC 105 of network 107. MIS 201 may also identify a home network 103 of UE 101 based on information provided by UE 101 (at 204). For example, UE 101 may have provided a PLMN identifier or other identifier of network 103, and/or may otherwise provide information based on which MIS 201 may identify the home network of UE 101. MIS 201 may accordingly output (at 208) a request to the home network (e.g., network 103, in this example) of UE 101 to access MEC 105 of network 107.

As shown in FIG. 3, UE 101 may receive and/or maintain (at 302) the information associated with services, MECs, and/or networks (e.g., some or all of the information discussed above with respect to MIS 201). In some embodiments, UE 101 may receive the information from MIS 201 or some other suitable device or system. In some embodiments, UE 101 may receive the information via an Over-the-Air ("OTA") update or other suitable procedure. In this manner, UE 101 may be able to identify (at 304) MEC 105 and/or network 107 associated with a given service, without needing to communicate with MIS 201 after identifying the demand for the service. In such embodiments, UE 101 may proceed to request (at 306) access to MEC 105 of network 107.

Figure 4:
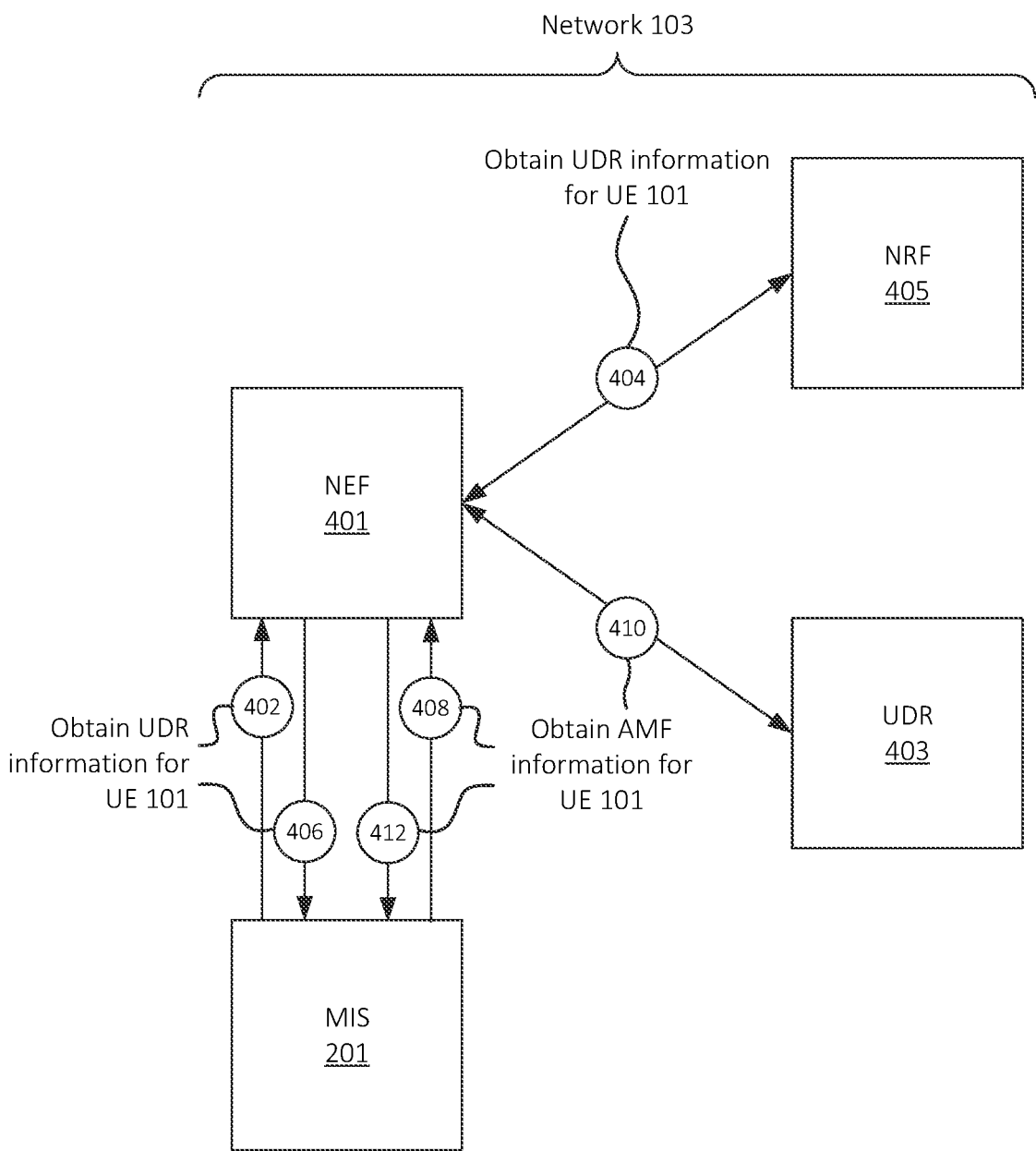
FIG. 4 illustrate an example of identifying an access management entity of a network to which such requests should be directed, in accordance with some embodiments.

FIG. 4 illustrates an example of operations that may be performed by UE 101 and/or MIS 201 when requesting (e.g., at 104) access to MEC 105 of network 107. In some embodiments, operations 402, 406, 408, and 410 may be performed by MIS 201 (e.g., when MIS 201 requests at 208) to request UE access to MEC 105 on behalf of UE 101. For example, the operations shown in FIG. 4 may be used by MIS 201 to identify one or more elements of network 103 with which MIS 201 should communicate in order to request authorization for UE 101 to access MEC 105 of network 107.

As shown, MIS 201 may communicate with an external interface of network 103, such as Network Exposure Function ("NEF") 401. NEF 401 may, for example, securely provide for communications between elements of network 103 with external devices or systems, such as MIS 201. For example, NEF 401 may authenticate and/or verify authorization of MIS 201 and/or other devices or systems to request information from elements of network 103 or to otherwise communicate with such elements. In this example, assume that NEF 401 has authenticated and/or verified authorization of MIS 201 to perform the operations discussed herein.

MIS 201 may, for example, request (at 402) information indicating a UE information repository, such as Unified Data Repository ("UDR") 403, a Unified Data Management function ("UDM"), etc. of network 103 that maintains information associated with UE 101. NEF 401 may determine that the request should be forwarded to a network topology repository of network 103, such as Network Repository Function ("NRF") 405, which maintains information indicating a topology or other attributes of network 103. For example, NEF 401 may identify that a type of information requested is maintained or provided by NRF 405, and/or the request may include an indication that the information is being requested from NRF 405.

Network 103 may include multiple instances of one or more network functions, such as one or more instances of UDR 403, which may be distributed geographically, may be associated with different network slices, may be associated with different groups of UEs, or in some other manner. For example, one instance of UDR 403 may be associated with UE 101 (e.g., may be associated with a geographical region in which UE 101 is located, may be associated with a group or category with which UE 101 is associated, etc.), and one or more other instances of UDR 403 may not be associated with UE 101. NRF 405 may maintain information indicating a particular instance of UDR 403 with which UE 101 is associated, and may provide (at 404) an indication of such UDR 403 (e.g., an IP address, a UDR identifier, etc.) to NEF 401, which may provide (at 406) such information to MIS 201.

MIS 201 may communicate with the identified UDR 403, in order to identify an access control element (e.g., an Access and Mobility Management Function ("AMF")) with which UE 101 is associated. For example, as similarly noted above, network 103 may include multiple AMF instances, where a particular AMF instance (e.g., a particular AMF) is associated with UE 101. For example, UE 101 may be located in a tracking area ("TA") associated with such particular AMF, may have registered with the particular AMF, and/or may otherwise be associated with the particular AMF. MIS 201 may output (at 408) a request to NEF 401 for information identifying the particular AMF with which UE 101 is associated. NEF 401 may output (at 410) a request to UDR 403 for information indicating the particular AMF. For example, UDR 403 may, in the course of operation of network 103, receive and maintain such information, and may provide the information to NEF 401 in response to the request. NEF 401 may provide (at 412) information indicating the particular AMF to MIS 201, where such information includes an IP address of the AMF and/or some other suitable identifier.

In some situations, UE 101 may be connected to a home network of UE 101, and the AMF indicated by UDR 403 (e.g., at 408-412) may be an AMF of the home network of UE 101. In other situations, UE 101 may be connected to a network other than a home network of UE 101 (e.g., a "visited" network, a "roaming" network, etc.), and the AMF indicated by UDR 403 may be an AMF of the visited, roaming, etc. network. In situations where UE 101 is connected to a network other than a home network of UE 101, NRF 405 may be an element of the network to which UE 101 is connected (e.g., a visited, roaming, etc. network with respect to UE 101).

Figure 5:
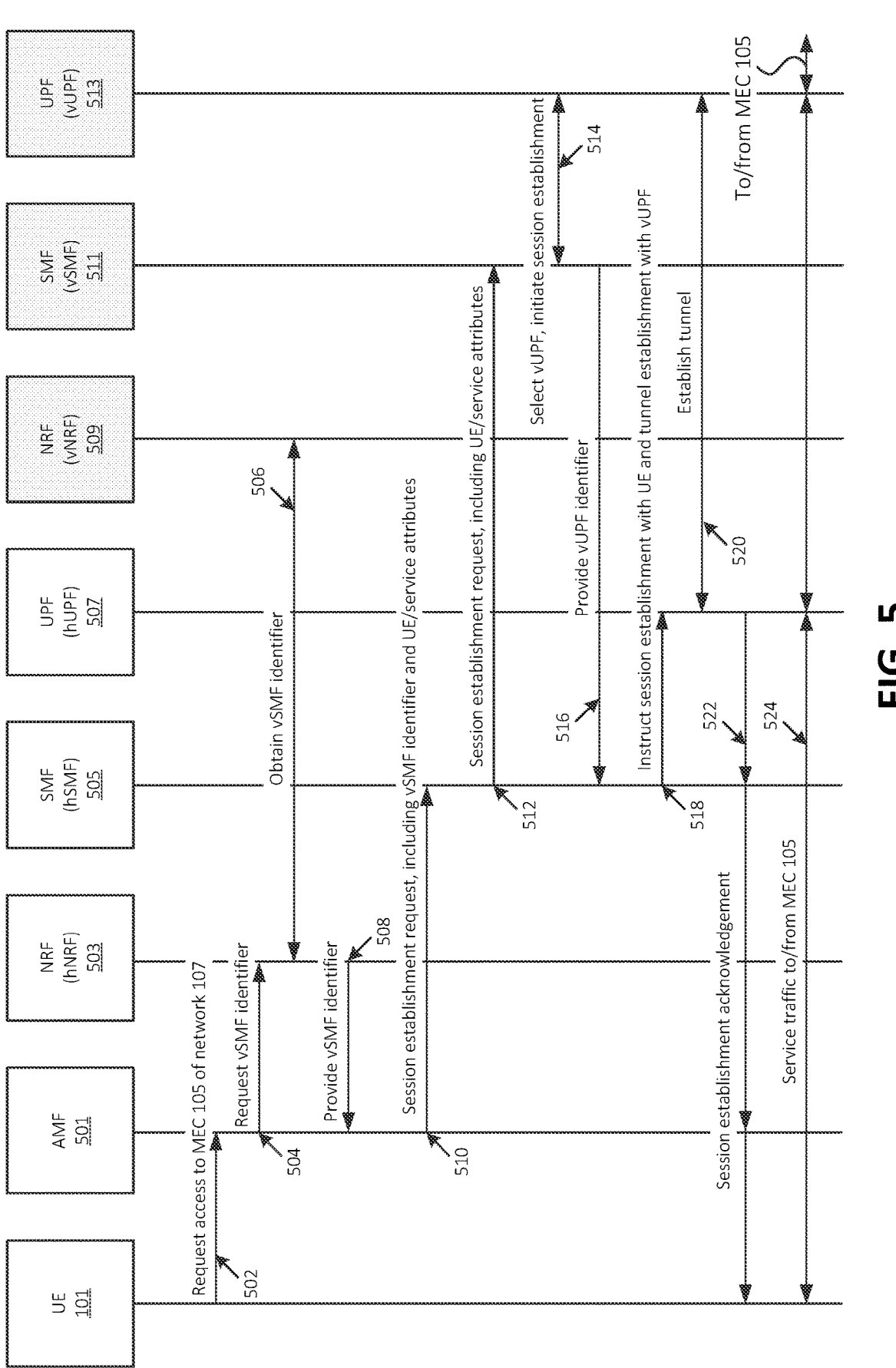
FIG. 5 illustrates an example of providing a service, provided by one network to a UE that is connected to another network, in accordance with some embodiments.

FIG. 5 illustrates an example of establishing communications between UE 101 and network 107 (e.g., MEC 105 of network 107) via network 103. In this example, some network elements (e.g., AMF 501, NRF 503, Session Management Function ("SMF") 505, and UPF 507) may be elements of network 103, which may be a network to which UE 101 is wirelessly connected. In some situations, network 103 may be a home network of UE 101. In other situations, network 103 may be a network other than a home network of UE 101. Additionally, other network elements (e.g., NRF 509, SMF 511, and UPF 513) may be elements of another network, such as network 107 with which MEC 105 is associated. In order to aid in understanding of the figure, some of the elements of network 103 are notated with an "h" (e.g., NRF 503 is also referred to as an hNRF, SMF 505 is also referred to as an hSMF, etc.) and the elements of network 107 are notated with a "v" (e.g., vNRF, vSMF, and vUPF). Additionally, elements of network 107 are shown with shaded boxes to further aid in understanding of the figure.

As shown, UE 101 may request (at 502) access to MEC 105 of network 107. For example, as discussed above, UE 101 may have identified a demand for a service associated with MEC 105, and/or may otherwise have determined that UE 101 should communicate with MEC 105. UE 101 may, for example, output the request to AMF 501 of network 103 (e.g., an AMF instance that has been assigned to or is otherwise associated with UE 101, such as during a registration procedure between UE 101 and network 103). In some embodiments, in lieu of UE 101 requesting (at 501) access to MEC 105, MIS 201 and/or some other device or system may request the access to MEC 105 on behalf of UE 101 (e.g., after identifying AMF 501, as discussed above with respect to FIG. 4). In some embodiments, the request to access MEC 105 may be, may include, and/or may be included in a PDU session request.

In some embodiments, the request (at 502) may include an identifier of MEC 105 (e.g., an IP address or other identifier), an identifier of network 107 with which MEC 105 is associated (e.g., a PLMN identifier), an identifier of an operator associated with MEC 105 and/or network 107 (e.g., an MNO identifier), attributes of one or more services being requested (e.g., an indicator of a service type, such as voice, video, AR, etc.), Quality of Service ("QoS") attributes and/or Service Level Agreements ("SLAs") associated with the requested service, or other suitable information.

In order to establish the requested communication session, AMF 501 may request (at 504) an identifier of a session management element (e.g., an SMF) to assist with the establishment of the communication session. AMF 501 may make the request to, for example, NRF 503 of network 103. The request from AMF 501 may include some or all of the information provided (at 502) by UE 101, such as service type, PLMN identifier, MEC identifier, etc. In some embodiments, the request from AMF 501 may include one or more identifiers of UE 101, such as a Subscription Permanent Identifier ("SUPI"), a Generic Public Subscription Identifier ("GPSI"), an International Mobile Station Equipment Identity ("IMEI"), an International Mobile Subscriber Identity ("IMSI"), a Mobile Directory Number ("MDN"), or the like. In some embodiments, AMF 501 may indicate that the request pertains to network 107 (e.g., that the requested SMF information should be information for an SMF of network 107).

NRF 503 may identify that the request pertains to communications associated with network 107 (e.g., based on the information provided by AMF 501, which may include the identifier of MEC 105 and/or the identifier of network 107). NRF 503 may accordingly request (at 506) an identifier of a session management element (e.g., an SMF) of network 107 to assist with the establishment of the requested communications between UE 101 and MEC 105 of network 107. For example, NRF 503 may make the request to NRF 509 of network 107. NRFs 503 and 509 may communicate via an N27 interface or some other suitable communication pathway between NRFs 503 and 509. In some embodiments, NRFs 503 and 509 may communicate with each other via respective NEFs associated with networks 103 and/or 107. NRF 509 may select or otherwise identify a particular SMF of network 107 (e.g., SMF 511) to facilitate the establishment of the communications between UE 101 and MEC 105 of network 107. For example, NRF 509 may identify that SMF 511 is associated with a service area of MEC 105, that SMF 511 is associated with a service type for the requested communications, and/or may otherwise identify or select SMF 511 (e.g., out of a set of candidate SMFs or SMF instances of network 107). NRF 509 may accordingly provide an identifier of the selected SMF 511 to NRF 503, such as an IP address of SMF 511 and/or some other suitable identifier.

NRF 503 may provide (at 508) the identifier of the selected SMF 511 of network 107 to AMF 501. AMF 501 may further initiate (at 510) the establish of one or more communication sessions between UE 101, network 103, and network 107. For example, as discussed below, AMF 501 may initiate the establishment of a PDU session between UE 101 and UPF 507, and a GTP tunnel between UPF 507 and UPF 513. AMF 501 may provide (at 510) an identifier of SMF 511 and/or other suitable information, such as one or more attributes of the requested service, an identifier of network 107, etc. SMF 505 may communicate (at 512) with the indicated SMF 511 of network 107 based on the request from AMF 501. SMF 505 may, for example, provide some or all of the information discussed above with respect to UE 101, service attributes (e.g., QoS information, SLAs, network slice information, service type, etc.), identifier of MEC 105, and/or other suitable information to SMF 511. In some embodiments, SMFs 505 and 511 may communicate via an N16 interface, via respective NEFs of networks 103 and 107, and/or some other suitable communication pathway.

SMF 511 may select a particular UPF 513 (e.g., out of a set of UPFs or UPF instances of network 107). For example, SMF 511 may identify that UPF 513 is associated with the identified MEC 105, is associated with attributes of the requested service, etc. SMF 511 may initiate (at 514) the establishment of communications associated with UPF 513. For example, SMF 511 may initiate an establishment of a PDU session between MEC 105 and UPF 513, may provide an identifier of UPF 507 to UPF 513, etc. SMF 511 may further provide (at 516) an identifier of UPF 513 to SMF 505, thus indicating that network 107 has accepted or acknowledged the request (at 513) from SMF 505 to establish communications associated with the request from UE 101.

SMF 505 may accordingly instruct (at 518) UPF 507 to establish communications with UE 101 and UPF 513. For example, SMF 505 may facilitate a PDU session establishment between UE 101 and UPF 513, and may further facilitate the establish of a tunnel (e.g., a GTP tunnel) between UPF 507 and UPF 513. As discussed above, such tunnel may be associated with an N9 interface or other suitable communication pathway. UPFs 507 and 513 may proceed to establish (at 520) the indicated tunnel. In some embodiments, UPF 513 may maintain a mapping between UE 101 (e.g., an IP address of UE 101) and the tunnel.

UPF 507 may provide (at 522) an acknowledgement that UPF 507 has received the instruction to establish the PDU session associated with UE 101, and further that UPF 507 has established a tunnel with UPF 513. SMF 505 may forward the acknowledgement to AMF 501 (e.g., in response to the request at 510) from AMF 501), and AMF 501 may provide an indication to UE 101 that a PDU session has been established between UE 101 and UPF 507. UE 101 may further identify that the established PDU session is associated with the request (at 502) to communicate with MEC 105 of network 107. UE 101 and MEC 105 may proceed to communicate (at 524) with each other via the established communications.

For example, UE 101 may output traffic, destined for MEC 105, via the established PDU session between UE 101 and UPF 507. UPF 507 may identify that traffic destined for MEC 105 (e.g., indicating an IP address of MEC 105 as a destination) is associated with the tunnel and/or with UPF 513, and may forward such traffic to UPF 513 via the tunnel. UPF 513 may additionally identify the traffic destined for MEC 105, and may output such traffic to MEC 105 (e.g., via a PDU session or other suitable type of communication session).

Similarly, MEC 105 may output traffic, destined for UE 101, to UPF 513. UPF 513 may identify that traffic destined for UE 101 (e.g., traffic from MEC 105 and destined for UE 101) should be forwarded to UPF 507 via the tunnel. UPF 507 may forward such traffic to UE 101 via the PDU session between UPF 507 and UE 101, based on the traffic indicating UE 101 as its destination. In this manner, UE 101 may remain wirelessly connected to network 103 while obtaining services provided by MEC 105 of network 107. Further, as discussed above, since the communication sessions associated with network 107 (e.g., the PDU session between MEC 105 and UPF 513) are accessible and visible to network 107, an operator of network 107 may be able to track the usage of resources of network 107 by specific UEs 101.

As noted above, network 103 (e.g., with which AMF 501, NRF 503, SMF 505, and UPF 507) may be a network other than a home network of UE 101. In either instance, the operations discussed above may be similar. As such, the operations described above may apply to multiple different connectivity scenarios. Such scenarios may include a scenario in which UE 101 is connected to a home network of UE 101 and requests access to MEC 105 of another network, and may further include another scenario in which UE 101 is connected to a first roaming/visited network and requests access to MEC 105 of a second roaming/visited network.

Figure 6:
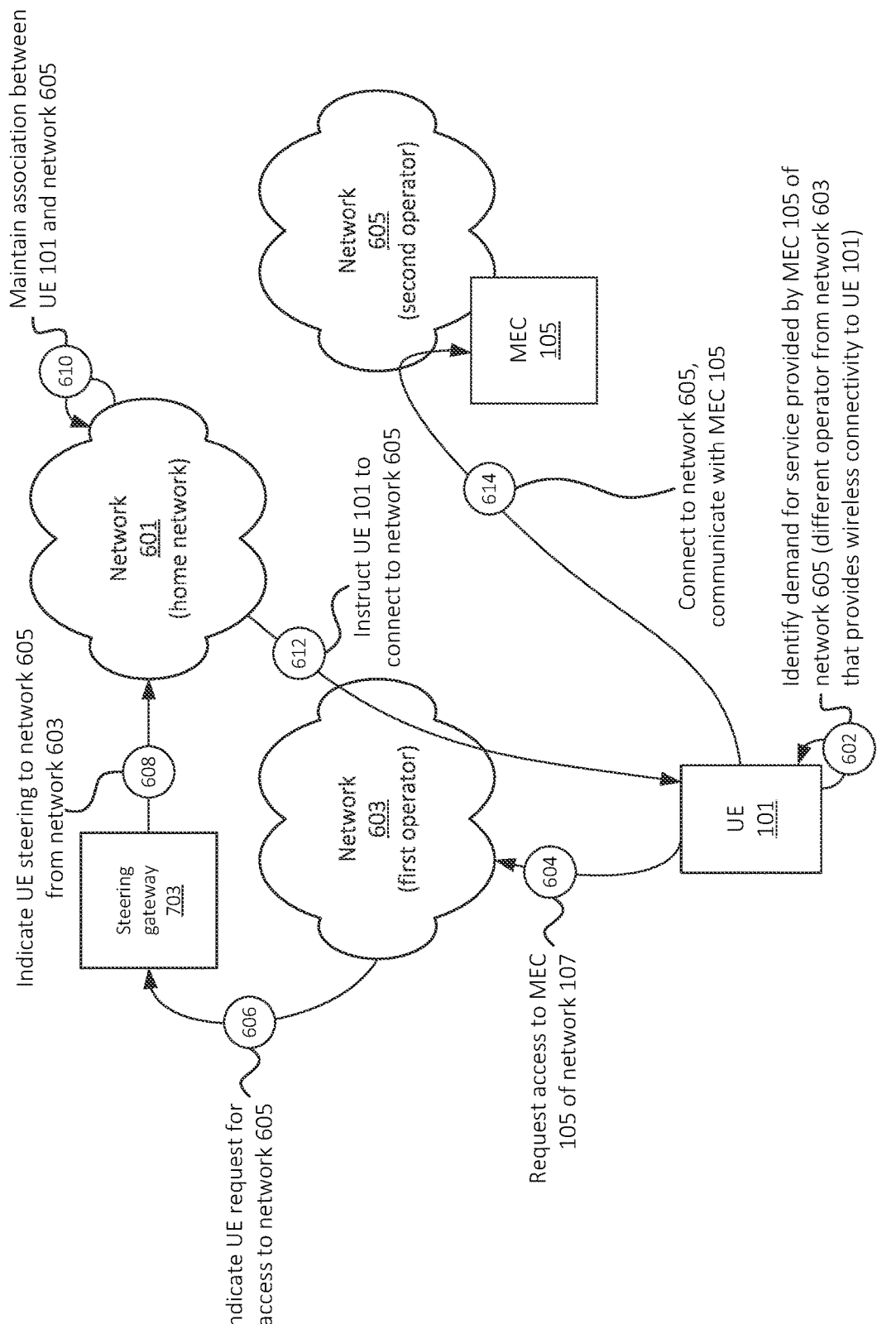
FIGS. 6 and 7 illustrate examples of steering a UE from a network, to which the UE is connected, to a network from which the UE is requesting a service, in accordance with some embodiments.

FIG. 6 illustrates another example of providing access to MEC 105 when UE 101 requests such access via another network. As shown, UE 101 may be associated with network 601 as a home network, and may be connected to network 603 (e.g., may be roaming on, visiting, etc. network 603). UE 101 may identify (at 602) a demand for a service provided by MEC 105 of network 605 (e.g., another network that is separate from network 603, to which UE 101 is currently connected, and that is also not a home network of UE 101). UE 101 may request (at 604) access to network 605. As similarly discussed above, UE 101 may indicate an identifier of network 605 (e.g., a PLMN identifier), an identifier of MEC 105, an indication of a service or service type associated with the request, and/or other suitable information. The request (at 604) may be provided to an AMF of network 603 or other suitable element of network 603. Network 603 (e.g., the AMF of network 603) may identify that the request is associated with a network other than network 603 (e.g., network 605), and may forward (at 606) the request to Steering Gateway 703 or some other suitable device or system that facilitates steering of UEs from network 603 and/or to network 605. In some embodiments, Steering Gateway 703 may be a device or system that is external to networks 601, 603, and/or 605. In such embodiments, network 603 and/or network 605 may communicate with Steering Gateway 703 via a NEF, a SCEF, a Security Edge Protection Proxy ("SEPP"), one or more intermediaries, or other suitable communicate pathways.

In some embodiments, network 601 may include a first SEPP via which network 601 communicates with Steering Gateway 703, and network 603 may include a second SEPP via which network 603 communicates with Steering Gateway 703. In some embodiments, Steering Gateway 703 may include, may implement, may be implemented by, and/or may otherwise be associated with a Roaming Hub ("RH"), a Roaming Value-Added Service ("RVAS"), and/or other suitable device or system. Steering Gateway 703 may, in some embodiments, maintain rules, policies, etc. (e.g., as provided by networks 601, 603, and/or 605) based on which Steering Gateway 703 may verify, authenticate, and/or otherwise facilitate roaming and/or steering requests associated with one or more UEs.

In this example, assume that Steering Gateway 703 determines that the steering request is approved (e.g., that UE 101 is authorized to receive the requested service from MEC 105 of network 605). Steering Gateway 703 may indicate (at 608) to network 601 that UE 101 should be steered to network 605, and/or may request that UE 101 be steered to network 605. In some embodiments, one or more elements of network 601, such as a PCF or other suitable device or system, may determine whether UE 101 is authorized to access MEC 105 of network 605. Assuming that network 601 determines that UE 101 is authorized to access MEC 105, network 601 may maintain (at 610) an association between UE 101 and network 605. Such association may indicate, for example, that UE 101 is being steered to network 605, that network 603 is no longer a network to which UE 101 is connected, etc. Network 601 may instruct (at 612) UE 101 to connect to network 605. For example, network 601 may communicate with an AMF of network 603, where the AMF forwards the instruction to UE 101. UE 101 may accordingly connect (at 614) to network 605, which may include requesting a connection to a RAN of network 605, and disconnecting from a RAN of network 603. Once connected to network 605, UE 101 may communicate with MEC 105.

Figure 7:
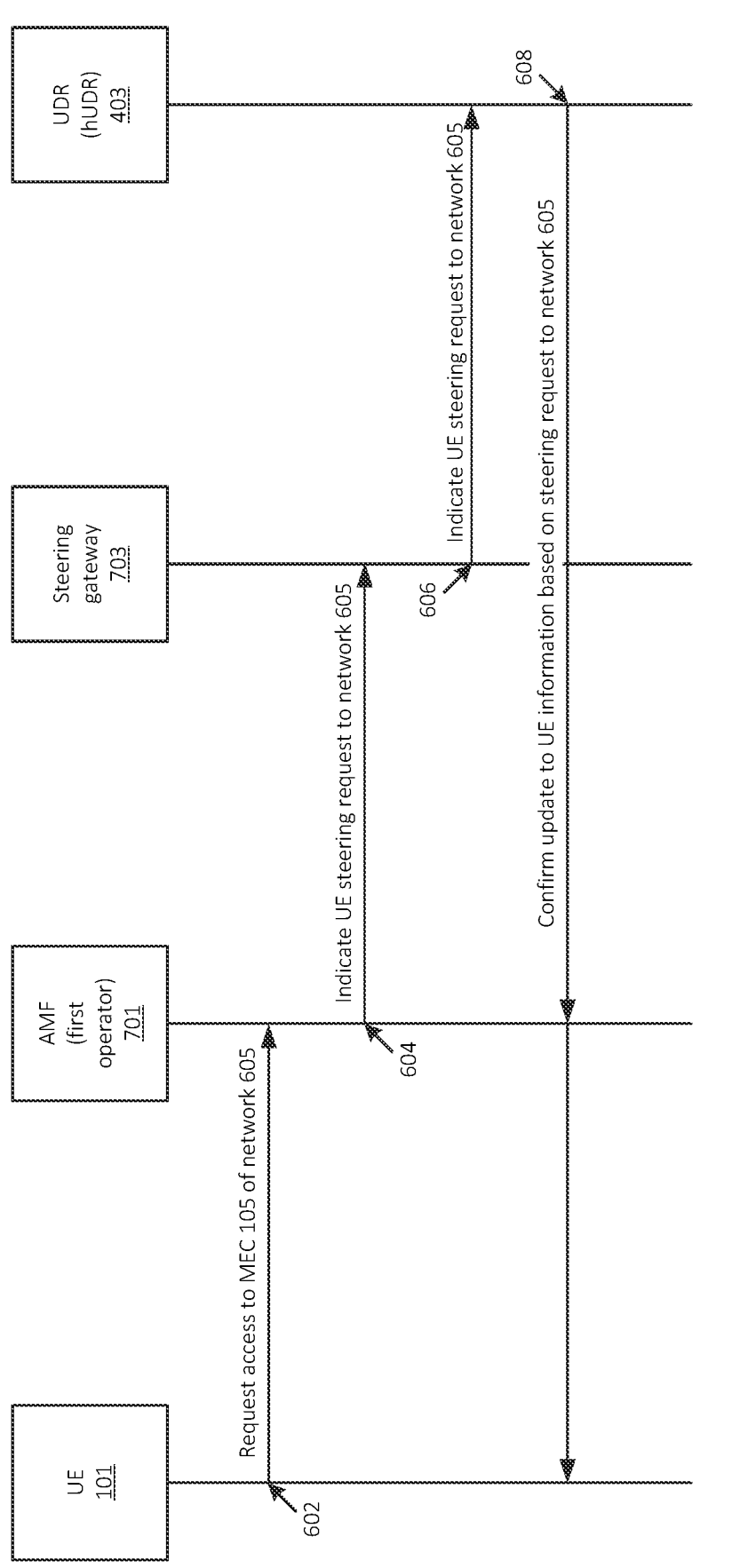

FIG. 7 provides an example of some of the operations shown in FIG. 6 (e.g., operations 604-612). As shown, AMF 701 of network 603 may receive (at 602) the request from UE 101, indicating the requested connection to MEC 105 of network 107. AMF 701 may output (at 604) a steering request to Steering Gateway 703 based on identifying that the request from UE 101 is associated with a different network (e.g., network 605). As discussed above, AMF 701 may communicate with Steering Gateway 703 via a SEPP of network 603 and/or some other suitable communication pathway.

Steering Gateway 703 may verify, authenticate, etc. the request and may indicate (at 606) to UDR 403 of network

601 (e.g., the home network of UE 101) that UE 101 should be steered to network 605. UDR 403 may update UE information associated with UE 101, to indicate that UE 101 is (or will be) connected to network 605 (e.g., in lieu of network 603), and may output (at 608) an indication to AMF 701 of network 603 that UE 101 should be steered to network 605. AMF 701 may forward the indication to UE 101, based on which UE 101 may connect to network 605, as discussed above.

Figure 8:
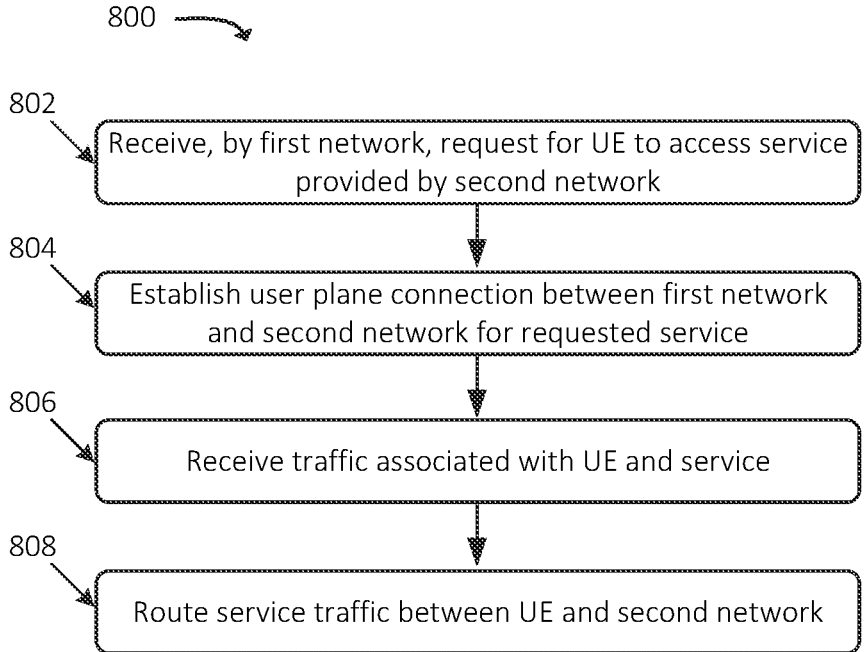
FIG. 8 illustrates an example process for providing a service, provided by one network to a UE that is connected to another network, in accordance with some embodiments.

FIG. 8 illustrates an example process 800 for providing a service, provided by a network (e.g., as provided by an edge computing device of the network), to a UE (e.g., UE 101) that is connected another network. In some embodiments, some or all of process 800 may be performed by one or more elements of the network to which UE 101 is connected.

As shown, process 800 may include receiving (at 802), by a first network, a request for UE 101 to access a service provided by a second network. For example, as discussed above, the UE may be connected to the first network (e.g., via a RAN of the first network) and may have identified a demand for a particular service offered by another network, such as by a particular MEC 105 of the other network. In some embodiments, some other device or system may have identified the demand for the service on behalf of UE 101, such as MIS 201. In some embodiments, the request may be received by an AMF of the first network.

Process 800 may further include establishing (at 804) a user plane connection between the first network and the second network for the requested service. For example, one or more elements of the first network may communicate with one or more elements of the second network to establish the connection. As discussed above, such communications may occur between respective NRFs, SMFs, or other elements of such networks. The established user plane connection may include, may be implemented by, and/or may otherwise be associated with a connection or other type of communication session between respective gateways of the first and second networks, such as respective UPFs of the first and second networks. The user plane connection may include, may be implemented by, may be associated with, etc., a GTP tunnel, an N9 interface, or other suitable communication pathway. The first and second networks (e.g., the first and second UPFs) may maintain information associating UE 101 and/or the service (e.g., one or more identifiers of the service, one or more identifiers of MEC 105, etc.) with the established connection between the respective UPFs.

Process 800 may additionally include receiving (at 806) traffic associated with UE 101 and the service, and routing (at 808) the service traffic between UE 101 and the second network. For example, the UPF of the first network (e.g., the network to which UE 101 is wirelessly connected) may receive traffic from UE 101, where such traffic includes an identifier of the service, an identifier of the second network, an identifier of MEC 105 of the second network, etc. Based on the identifier of the service, the identifier of the second network, etc., the UPF of the first network may forward the traffic to the UPF of the second network via the established communication session. Similarly, the UPF of the second network may receive traffic (e.g., from MEC 105) with an identifier of UE 101 (e.g., as a destination of the traffic) and may forward such traffic to the UPF of the first network, which may proceed to forward the traffic (e.g., via a RAN of the first network) to UE 101.

Figure 9:
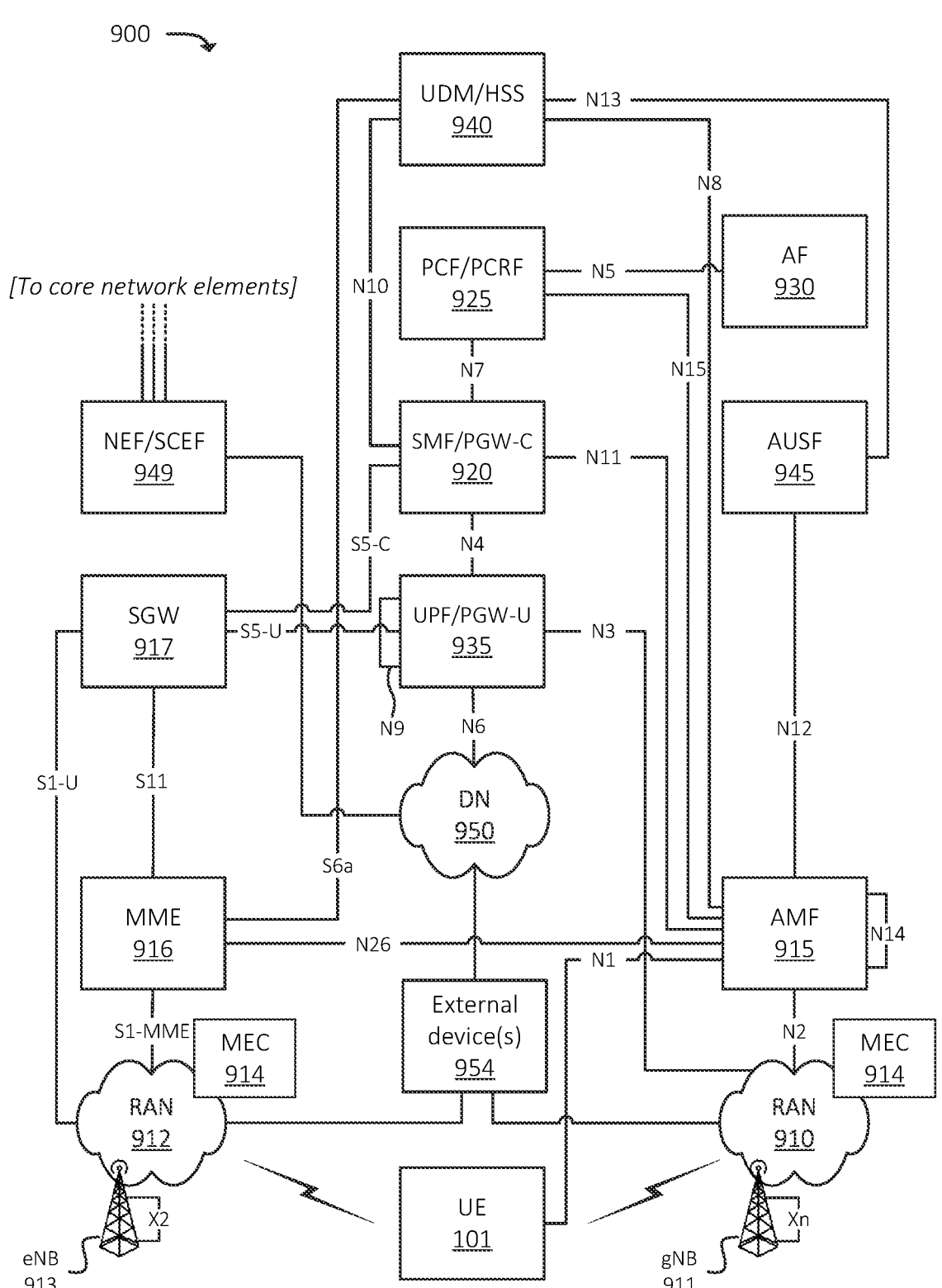
FIGS. 9 and 10 illustrate example environments in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 900 may represent or may include a 5G core ("5GC"). As shown, environment 900 may include UE 101, RAN 910 (which may include one or more Next Generation Node Bs ("gNBs") 911), RAN 912 (which may include one or more evolved Node Bs ("eNBs") 913), and various network functions such as AMF 915, Mobility Management Entity ("MME") 916, Serving Gateway ("SGW") 917, Session Management Function ("SMF")/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Unified Data Management ("UDM")/Home Subscriber Server ("HSS") 940, Authentication Server Function ("AUSF") 945, and Network Exposure Function ("NEF")/Service Capability Exposure Function ("SCEF") 949. Environment 900 may also include one or more networks, such as Data Network ("DN") 950. Environment 900 may include one or more additional devices or systems communicatively coupled to one or more networks (e.g., DN 950), such as one or more external devices 954.

The example shown in FIG. 9 illustrates one instance of each network component or function (e.g., one instance of SMF/PGW-C 920, PCF/PCRF 925, UPF/PGW-U 935, UDM/HSS 940, and/or AUSF 945). In practice, environment 900 may include multiple instances of such components or functions. For example, in some embodiments, environment 900 may include multiple "slices" of a core network, where each slice includes a discrete and/or logical set of network functions (e.g., one slice may include a first instance of AMF 915, SMF/PGW-C 920, PCF/PCRF 925, and/or UPF/PGW-U 935, while another slice may include a second instance of AMF 915, SMF/PGW-C 920, PCF/PCRF 925, and/or UPF/PGW-U 935). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Additionally, one or more elements of environment 900 may be implemented in a virtualized and/or containerized manner. For example, one or more of the elements of environment 900 may be implemented by one or more Virtualized Network Functions ("VNFs"), Cloud-Native Network Functions ("CNFs"), etc. In such embodiments, environment 900 may include, may implement, and/or may be communicatively coupled to an orchestration platform that provisions hardware resources, installs containers or applications, performs load balancing, and/or otherwise manages the deployment of such elements of environment 900. In some embodiments, such orchestration and/or management of such elements of environment 900 may be performed by, or in conjunction with, the open-source Kubernetes® API or some other suitable virtualization, containerization, and/or orchestration system.

Elements of environment 900 may interconnect with each other and/or other devices via wired connections, wireless connections, or a combination of wired and wireless connections. Examples of interfaces or communication pathways between the elements of environment 900, as shown in FIG. 9, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 9, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 900 may be, may include, may be implemented by, and/or may be communicatively coupled to one or more of the networks discussed above (e.g., networks 103, 107, 601, 603, and/or 605). For example, network 103 may include one instance of environment 900, network 107 may include another instance of environment 900, and so on.

UE 101 may include a computation and communication device, such as a wireless mobile communication device that is capable of communicating with RAN 910, RAN 912, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 101 may communicate with one or more other elements of environment 900. UE 101 may communicate with RAN 910 via an air interface (e.g., as provided by gNB 911). For instance, RAN 910 may receive traffic (e.g., user plane traffic such as voice call traffic, data traffic, messaging traffic, etc.) from UE 101 via the air interface, and may communicate the traffic to UPF/PGW-U 935 and/or one or more other devices or networks. Further, RAN 910 may receive signaling traffic, control plane traffic, etc. from UE

101 via the air interface, and may communicate such signaling traffic, control plane traffic, etc. to AMF 915 and/or one or more other devices or networks. Additionally, RAN 910 may receive traffic intended for UE 101 (e.g., from UPF/PGW-U 935, AMF 915, and/or one or more other devices or networks) and may communicate the traffic to UE 101 via the air interface.

RAN 912 may be, or may include, a LTE RAN that includes one or more base stations (e.g., one or more eNBs 913), via which UE 101 may communicate with one or more other elements of environment 900. UE 101 may communicate with RAN 912 via an air interface (e.g., as provided by eNB 913). For instance, RAN 912 may receive traffic (e.g., user plane traffic such as voice call traffic, data traffic, messaging traffic, signaling traffic, etc.) from UE 101 via the air interface, and may communicate the traffic to UPF/ PGW-U 935 (e.g., via SGW 917) and/or one or more other devices or networks. Further, RAN 912 may receive signaling traffic, control plane traffic, etc. from UE 101 via the air interface, and may communicate such signaling traffic, control plane traffic, etc. to MME 916 and/or one or more other devices or networks. Additionally, RAN 912 may receive traffic intended for UE 101 (e.g., from UPF/PGW-U 935, MME 916, SGW 917, and/or one or more other devices or networks) and may communicate the traffic to UE 101 via the air interface.

One or more RANs of environment 900 (e.g., RAN 910 and/or RAN 912) may include, may implement, and/or may otherwise be communicatively coupled to one or more edge computing devices, such as one or more Multi-Access/ Mobile Edge Computing ("MEC") devices (referred to sometimes herein simply as a "MECs") 105. MECs 105 may be co-located with wireless network infrastructure equipment of RANs 910 and/or 912 (e.g., one or more gNBs 911 and/or one or more eNBs 913, respectively). Additionally, or alternatively, MECs 105 may otherwise be associated with geographical regions (e.g., coverage areas) of wireless network infrastructure equipment of RANs 910 and/or 912. In some embodiments, one or more MECs 105 may be implemented by the same set of hardware resources, the same set of devices, etc. that implement wireless network infrastructure equipment of RANs 910 and/or 912. In some embodiments, one or more MECs 105 may be implemented by different hardware resources, a different set of devices, etc. from hardware resources or devices that implement wireless network infrastructure equipment of RANs 910 and/or 912. In some embodiments, MECs 105 may be communicatively coupled to wireless network infrastructure equipment of RANs 910 and/or 912 (e.g., via a high-speed and/or low-latency link such as a physical wired interface, a high-speed and/or low-latency wireless interface, or some other suitable communication pathway).

MECs 105 may include hardware resources (e.g., configurable or provisionable hardware resources) that may be configured to provide services and/or otherwise process traffic to and/or from UE 101, via RAN 910 and/or 912. For example, RAN 910 and/or 912 may route some traffic from UE 101 (e.g., traffic associated with one or more particular services, applications, application types, etc.) to a respective MEC 105 instead of to core network elements of 900 (e.g., UPF/PGW-U 935). MEC 105 may accordingly provide services to UE 101 by processing such traffic, performing one or more computations based on the received traffic, and providing traffic to UE 101 via RAN 910 and/or 912. MEC 105 may include, and/or may implement, some or all of the functionality described above with respect to UPF/PGW-U 935, AF 930, one or more application servers, and/or one or more other devices, systems, VNFs, CNFs, etc. In this manner, ultra-low latency services may be provided to UE 101, as traffic does not need to traverse links (e.g., backhaul links) between RAN 910 and/or 912 and the core network.

AMF 915 may include one or more devices, systems, VNFs, CNFs, etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915). In some embodiments, the description provided above with respect to AMF 915 may similarly pertain to AMFs 501 and/or 701.

MME 916 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 912 and/or eNBs 913, and/or to perform other operations.

SGW 917 may include one or more devices, systems, VNFs, CNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, CNFs, etc., that gather, process, store, and/or provide information in a manner described herein. SMF/PGW-C 920 may, for example, facilitate the establishment of communication sessions on behalf of UE 101. In some embodiments, the establishment of communications sessions may be performed in accordance with one or more policies provided by PCF/PCRF 925.

PCF/PCRF 925 may include one or more devices, systems, VNFs, CNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, CNFs, etc., that receive, store, and/or provide information that may be used in determining parameters (e.g., quality of service parameters, charging parameters, or the like) for certain applications.

UPF/PGW-U 935 may include one or more devices, systems, VNFs, CNFs, etc., that receive, store, and/or provide data (e.g., user plane data). For example, UPF/PGW-U 935 may receive user plane data (e.g., voice call traffic, data traffic, etc.), destined for UE 101, from DN 950, and may forward the user plane data toward UE 101 (e.g., via RAN 910, SMF/PGW-C 920, and/or one or more other devices). In some embodiments, multiple instances of UPF/PGW-U 935 may be deployed (e.g., in different geographical locations), and the delivery of content to UE 101 may be coordinated via the N9 interface (e.g., as denoted in FIG. 9 by the line marked "N9" originating and terminating at UPF/PGW-U 935). Similarly, UPF/PGW-U 935 may receive traffic from UE 101 (e.g., via RAN 910, RAN 912, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

UDM/HSS 940 and AUSF 945 may include one or more devices, systems, VNFs, CNFs, etc., that manage, update, and/or store, in one or more memory devices associated with AUSF 945 and/or UDM/HSS 940, profile information associated with a subscriber. In some embodiments, UDM/HSS 940 may include, may implement, may be communicatively coupled to, and/or may otherwise be associated with some other type of repository or database, such as a UDR (e.g., UDR 403). AUSF 945 and/or UDM/HSS 940 may perform authentication, authorization, and/or accounting operations associated with one or more UEs 101 and/or one or more communication sessions associated with one or more UEs 101.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 101 may communicate.

External devices 954 may include one or more devices or systems that communicate with UE 101 via 950 and one or more elements of 900 (e.g., via UPF/PGW-U 935). In some embodiments, external device 954 may include, may implement, and/or may otherwise be associated with MIS 201, Steering Gateway 703, and/or one or more other devices or systems. External devices 954 may include, for example, one or more application servers, content provider systems, web servers, or the like. External devices 954 may, for example, implement "server-side" applications that communicate with "client-side" applications executed by UE 101. External devices 954 may provide services to UE 101 such as gaming services, videoconferencing services, messaging services, email services, web services, and/or other types of services.

In some embodiments, external devices 954 may communicate with one or more elements of 900 (e.g., core network elements) via NEF/SCEF 949. NEF/SCEF 949 include one or more devices, systems, VNFs, CNFs, etc. that provide access to information, APIs, and/or other operations or mechanisms of one or more core network elements to devices or systems that are external to the core network (e.g., to external device 954 via 12N 950). NEF/SCEF 949 may maintain authorization and/or authentication information associated with such external devices or systems, such that NEF/SCEF 949 is able to provide information, that is authorized to be provided, to the external devices or systems. For example, a given external device 954 may request particular information associated with one or more core network elements. NEF/SCEF 949 may authenticate the request and/or otherwise verify that external device 954 is authorized to receive the information, and may request, obtain, or otherwise receive the information from the one or more core network elements. External device 954 may, in some situations, subscribe to particular types of requested information provided the one or more core network elements, and the one or more core network elements may provide (e.g., "push") the requested information to NEF/SCEF 949 (e.g., in a periodic or otherwise ongoing basis).

In some embodiments, external devices 954 may communicate with one or more elements of RAN 910 and/or 912 via an API or other suitable interface. For example, a given external device 954 may provide instructions, requests, etc. to RAN 910 and/or 912 to provide one or more services via one or more respective MECs 105. In some embodiments, such instructions, requests, etc. may include QoS parameters, Service Level Agreements ("SLAs"), etc. (e.g., maximum latency thresholds, minimum throughput thresholds, etc.) associated with the services.

Figure 10:
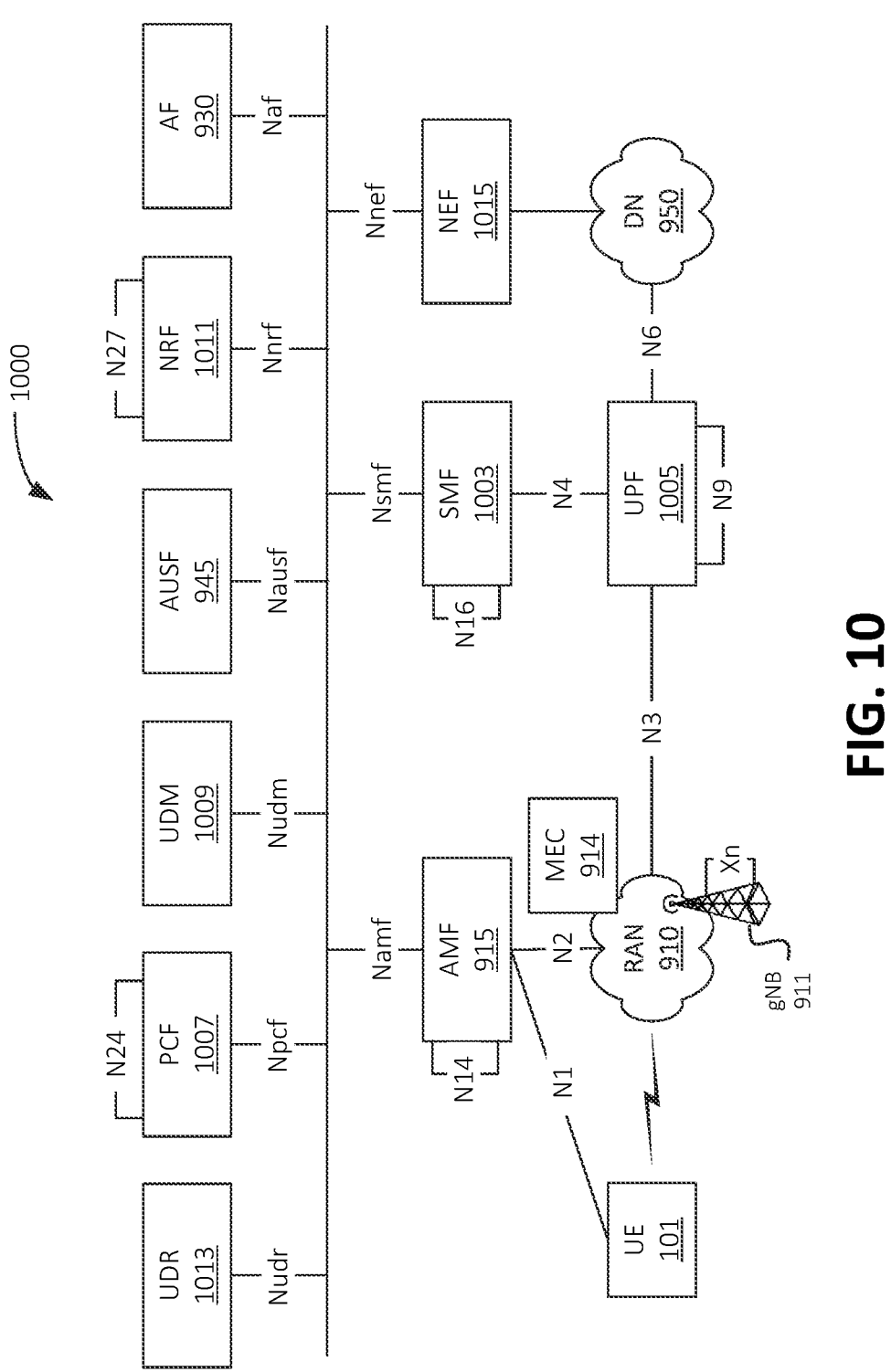

FIG. 10 illustrates another example environment 1000, in which one or more embodiments may be implemented. In some embodiments, environment 1000 may correspond to a 5G network, and/or may include elements of a 5G network. In some embodiments, environment 1000 may correspond to a 5G SA architecture. In some embodiments, environment 1000 may include a 5GC, in which 5GC network elements perform one or more operations described herein.

As shown, environment 1000 may include UE 101, RAN 910 (which may include one or more gNBs 911 or other types of wireless network infrastructure) and various network functions, which may be implemented as VNFs, CNFs, etc. Such network functions may include AMF 915, SMF 1003, UPF 1005, PCF 1007, UDM 1009, AUSF 945, Network Repository Function ("NRF") 1011, AF 930, UDR 1013, and NEF 1015. Environment 1000 may also include or may be communicatively coupled to one or more networks, such as Data Network DN 950.

The example shown in FIG. 10 illustrates one instance of each network component or function (e.g., one instance of SMF 1003, UPF 1005, PCF 1007, UDM 1009, AUSF 945, etc.). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF 1003, PCF 1007, UPF 1005, etc., while another slice may include a second instance of SMF 1003, PCF 1007, UPF 1005, etc.). Additionally, or alternatively, one or more of the network functions of environment 1000 may implement multiple network slices. The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include interfaces shown in FIG. 10 and/or one or more interfaces not explicitly shown in FIG. 10. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 1000 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 915), an Nudm interface (e.g., indicating communications to be routed to UDM 1009), an Npcf interface, an Nupf interface, an Nnef interface, an Nsmf interface, an Nnrf interface, an Nudr interface, an Naf interface, and/or one or more other SBIs.

In some embodiments, environment 1000 may be, may include, may be implemented by, and/or may be communicatively coupled to one or more of the networks discussed above (e.g., networks 103, 107, 601, 603, and/or 605). For example, network 103 may include one instance of environment 1000, network 107 may include another instance of environment 1000, and so on.

UPF 1005 may include one or more devices, systems, VNFs, CNFs, etc., that receive, route, process, and/or forward traffic (e.g., user plane traffic). As discussed above, UPF 1005 may communicate with UE 101 via one or more communication sessions, such as PDU sessions. Such PDU sessions may be associated with a particular network slice or other suitable QoS parameters, as noted above. UPF 1005 may receive downlink user plane traffic (e.g., voice call traffic, data traffic, etc. destined for UE 101) from DN 950, and may forward the downlink user plane traffic toward UE 101 (e.g., via RAN 910). In some embodiments, multiple UPFs 1005 may be deployed (e.g., in different geographical locations), and the delivery of content to UE 101 may be coordinated via the N9 interface. Similarly, UPF 1005 may receive uplink traffic from UE 101 (e.g., via RAN 910), and may forward the traffic toward DN 950. In some embodiments, UPF 1005 may implement, may be implemented by, may be communicatively coupled to, and/or may otherwise be associated with UPF/PGW-U 935. In some embodiments, UPF 1005 may communicate (e.g., via the N4 interface) with SMF 1003, regarding user plane data processed by UPF 1005 (e.g., to provide analytics or reporting information, to receive policy and/or authorization information, etc.).

PCF 1007 may include one or more devices, systems, VNFs, CNFs, etc., that aggregate, derive, generate, etc. policy information associated with the 5GC and/or UEs 101 that communicate via the 5GC and/or RAN 910. PCF 1007 may receive information regarding policies and/or subscriptions from one or more sources, such as subscriber databases (e.g., UDM 1009, UDR 1013, etc.), and/or from one or more users such as, for example, an administrator associated with PCF 1007. In some embodiments, the functionality of PCF 1007 may be split into multiple network functions or subsystems, such as an access and mobility PCF ("AM-PCF"), a session management PCF ("SM-PCF"), a UE PCF ("UE-PCF"), and so on. Such different "split" PCFs may be associated with respective SBIs (e.g., the AM-PCF may be associated with an Nampcf SBI, the SM-PCF may be associated with an Nsmpcf SBI, the UE-PCF may be associated with an Nuepcf SBI, and so on) via which other network functions may communicate with the split PCFs. The split PCFs may maintain information regarding policies associated with different devices, systems, and/or network functions.

NRF 1011 may include one or more devices, systems, VNFs, CNFs, etc. that maintain routing and/or network topology information associated with the 5GC. For example, NRF 1011 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 1013 may include one or more devices, systems, VNFs, CNFs, etc. that provide user and/or subscriber information, based on which PCF 1007 and/or other elements of environment 1000 may determine access policies, QoS policies, charging policies, or the like. In some embodiments, UDR 1013 may receive such information from UDM 1009 and/or one or more other sources. In some embodiments, the description provided above with respect to UDR 1013 may similarly pertain to UDR 403.

NEF 1015 include one or more devices, systems, VNFs, CNFs, etc. that provide access to information, APIs, and/or other operations or mechanisms of the 5GC to devices or systems that are external to the 5GC. NEF 1015 may maintain authorization and/or authentication information associated with such external devices or systems, such that NEF 1015 is able to provide information, that is authorized to be provided, to the external devices or systems. Such information may be received from other network functions of the 5GC (e.g., as authorized by an administrator or other suitable entity associated with the 5GC), such as SMF 1003, UPF 1005, a charging function ("CHF") of the 5GC, and/or other suitable network function. NEF 1015 may communicate with external devices or systems (e.g., external devices 954) via DN 950 and/or other suitable communication pathways.

While environment 1000 is described in the context of a 5GC, as noted above, environment 1000 may, in some embodiments, include or implement one or more other types of core networks. For example, in some embodiments, environment 1000 may be or may include a converged packet core, in which one or more elements may perform some or all of the functionality of one or more 5GC network functions and/or one or more EPC network functions. For example, in some embodiments, AMF 915 may include, may implement, may be implemented by, and/or may otherwise be associated with MME 916; SMF 1003 may include, may implement, may be implemented by, and/or may otherwise be associated with SGW 917; PCF 1007 may include, may implement, may be implemented by, and/or may otherwise be associated with a PCRF (e.g., PCF/PCRF 925); NEF 1015 may include, may implement, may be implemented by, and/or may otherwise be associated with a SCEF (e.g., NEF/SCEF 949); and so on.

Figure 11:
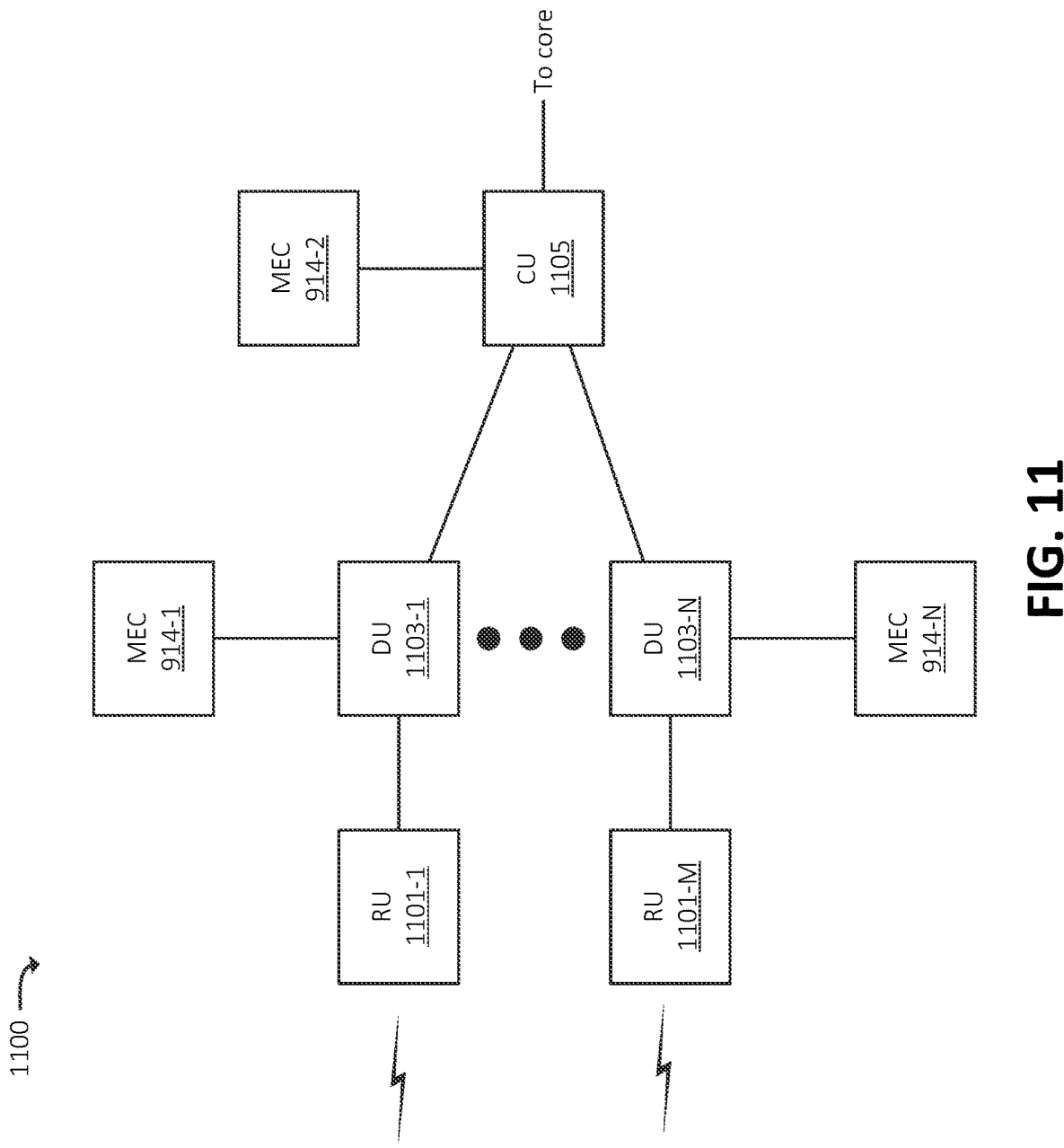
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 910 or some other RAN). In some embodiments, a particular RAN 910 may include one RAN environment 1100. In some embodiments, a particular RAN 910 may include multiple RAN environments 1100. In some embodiments, RAN environment 1100 may correspond to a particular gNB 911 of RAN 910. In some embodiments, RAN environment 1100 may correspond to multiple gNBs 911. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 915 and/or UPF 1005). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

One or more elements of RAN environment 1100 may, in some embodiments, be communicatively coupled to one or more MECs 105. For example, DU 1103-1 may be communicatively coupled to MEC 105-1, DU 1103-N may be communicatively coupled to MEC 105-N, CU 1105 may be communicatively coupled to MEC 105-2, and so on. MECs 105 may include hardware resources (e.g., configurable or provisionable hardware resources) that may be configured to provide services and/or otherwise process traffic to and/or from UE 101, via a respective RU 1101.

For example, DU 1103-1 may route some traffic, from UE 101, to MEC 105-1 instead of to a core network via CU 1105. MEC 105-1 may process the traffic, perform one or more computations based on the received traffic, and may provide traffic to UE 101 via RU 1101-1. As discussed above, MEC 105 may include, and/or may implement, some or all of the functionality described above with respect to UPF 1005, AF 930, and/or one or more other devices, systems, VNFs, CNFs, etc. In this manner, ultra-low latency services may be provided to UE 101, as traffic does not need to traverse DU 1103, CU 1105, links between DU 1103 and CU 1105, and an intervening backhaul network between RAN environment 1100 and the core network.

Figure 12:
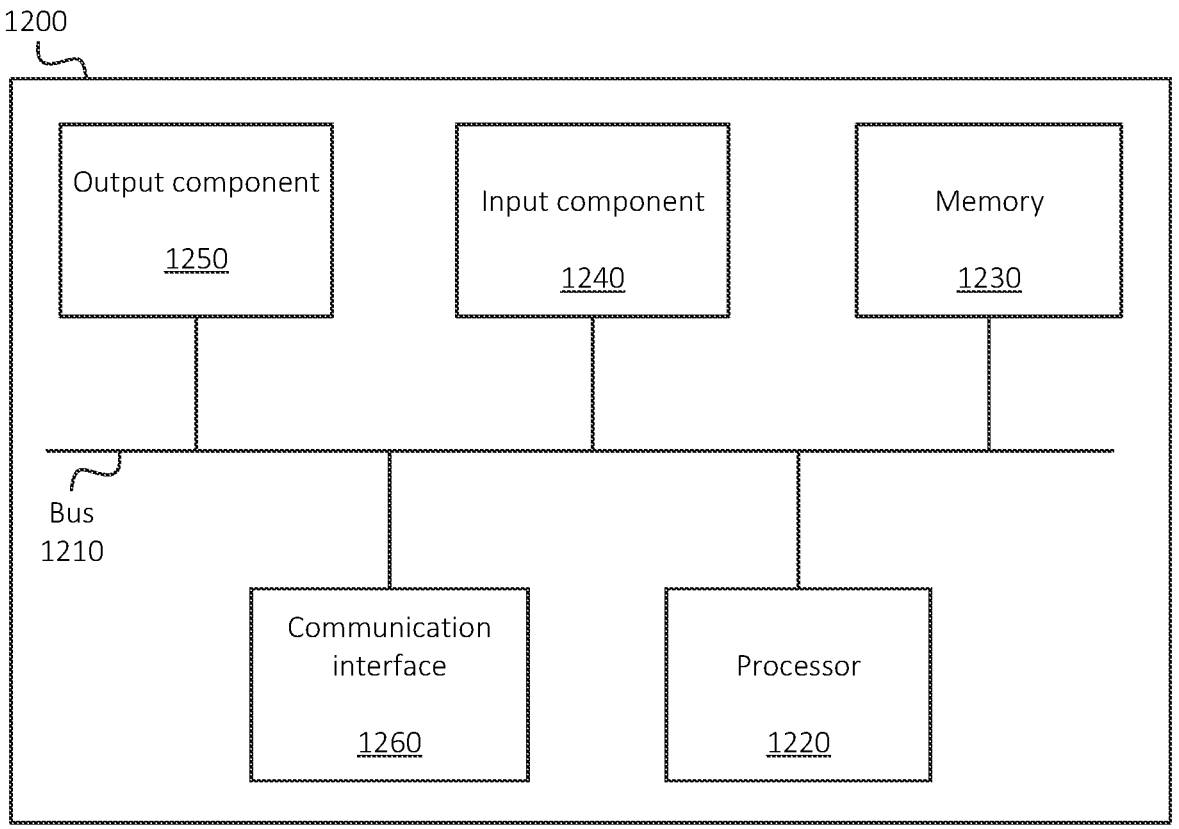
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, a set of provisioned hardware resources of a cloud computing system, or other suitable type of hardware that interprets and/or executes instructions (e.g., processor-executable instructions). In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems (e.g., with RAN 910, RAN 912, DN 950, etc.). For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1200 may include more than one communication interface 1260. For instance, device 1200 may include an optical interface, a wireless interface, an Ethernet interface, and/or one or more other interfaces.

Device 1200 may perform certain operations relating to one or more processes described above. Device 1200 may perform these operations in response to processor 1220 executing instructions, such as software instructions, processor-executable instructions, etc. stored in a computer-readable medium, such as memory 1230. A computer-readable medium may be defined as a non-transitory memory device. A memory device may include space within a single physical memory device or spread across multiple physical memory devices. The instructions may be read into memory 1230 from another computer-readable medium or from another device. The instructions stored in memory 1230 may be processor-executable instructions that cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a memory device storing a set of processor-executable instructions; and
   one or more processors configured to execute the set of processor-executable instructions, wherein executing the set of processor-executable instructions causes the one or more processors to:
      receive, by a first network to which a User Equipment ("UE") is wirelessly connected, a first request to access a service provided by a second network;
      establish, based on the first request, a user plane connection between the first network and the second network while the UE remains wirelessly connected to the first network, wherein establishing the user plane connection between the first network and the second network includes:
         communicating with the second network to obtain information indicating a session management element of the second network; and
         outputting a second request to the session management element of the second network, wherein the session management element of the second network facilitates establishment of the user plane connection between the first network and the second network based on the second request;
      receive, by the first network and from the UE, traffic that is associated with the service; and
      output, by the first network and via the user plane connection, the received traffic to the second network.

2. The device of claim 1, wherein the user plane connection includes a connection between a first user plane gateway of the first network and a second user plane gateway of the second network.

3. The device of claim 1, wherein the user plane connection includes a connection that implements an N9 interface.

4. The device of claim 1, wherein the user plane connection includes a General Packet Radio Service ("GPRS") Tunneling Protocol ("GTP") tunnel.

5. The device of claim 1, wherein the first request from the UE is received by an Access and Mobility Management Function ("AMF") of the first network.

6. The device of claim 1, wherein the service is provided by a Multi-Access/Mobile Edge Computing ("MEC") device that is associated with the second network.

7. The device of claim 1, wherein the session management element of the second network is a second session management element, wherein outputting the second request to the second session management element includes outputting a third request to a first session management element of the first network, wherein the third request includes information indicating the second session management element of the second network, wherein the first session management element outputs the second request to the second session management element based on the third request.

8. A non-transitory computer-readable medium, storing a plurality of processor-executable instructions to:

receive, by a first network to which a User Equipment ("UE") is wirelessly connected, a first request to access a service provided by a second network;

establish, based on the first request, a user plane connection between the first network and the second network while the UE remains wirelessly connected to the first network, wherein establishing the user plane connection between the first network and the second network includes:

communicating with the second network to obtain information indicating a session management element of the second network; and outputting a second request to the session management element of the second network, wherein the session management element of the second network facilitates establishment of the user plane connection between the first network and the second network based on the second request;

receive, by the first network and from the UE, traffic that is associated with the service; and output, by the first network and via the user plane connection, the received traffic to the second network.

9. The non-transitory computer-readable medium of claim 8, wherein the user plane connection includes a connection between a first user plane gateway of the first network and a second user plane gateway of the second network.

10. The non-transitory computer-readable medium of claim 8, wherein the user plane connection includes a connection that implements an N9 interface.

11. The non-transitory computer-readable medium of claim 8, wherein the user plane connection includes a General Packet Radio Service ("GPRS") Tunneling Protocol ("GTP") tunnel.

12. The non-transitory computer-readable medium of claim 8, wherein the first request from the UE is received by an Access and Mobility Management Function ("AMF") of the first network.

13. The non-transitory computer-readable medium of claim 8, wherein the service is provided by a Multi-Access/Mobile Edge Computing ("MEC") device that is associated with the second network.

14. A method, comprising:

receiving, by a first network to which a User Equipment ("UE") is wirelessly connected, a first request to access a service provided by a second network;

establishing, based on the first request, a user plane connection between the first network and the second network while the UE remains wirelessly connected to the first network, wherein establishing the user plane connection between the first network and the second network includes:

communicating with the second network to obtain information indicating a session management element of the second network; and outputting a second request to the session management element of the second network, wherein the session management element of the second network facilitates establishment of the user plane connection between the first network and the second network based on the second request;

receiving, by the first network and from the UE, traffic that is associated with the service; and outputting, by the first network and via the user plane connection, the received traffic to the second network.

15. The method of claim 14, wherein the user plane connection includes a connection between a first User Plane Function ("UPF") of the first network and a second UPF of the second network.

16. The method of claim 14, wherein the user plane connection includes a connection that implements an N9 interface.

17. The method of claim 14, wherein the user plane connection includes a General Packet Radio Service ("GPRS") Tunneling Protocol ("GTP") tunnel.

18. The method of claim 14, wherein the first request from the UE is received by an Access and Mobility Management Function ("AMF") of the first network.

19. The method of claim 14, wherein the service is provided by a Multi-Access/Mobile Edge Computing ("MEC") device that is associated with the second network.

20. The method of claim 14, wherein the session management element of the second network is a second session management element, wherein outputting the second request to the second session management element includes outputting a third request to a first session management element of the first network, wherein the third request includes information indicating the second session management element of the second network, wherein the first session management element outputs the second request to the second session management element based on the third request.

* * * * *